United States Patent
Dong et al.

(10) Patent No.: US 7,446,078 B2
(45) Date of Patent: Nov. 4, 2008

(54) ADSORBENT FOR WATER REMOVAL FROM AMMONIA

(75) Inventors: Chun Christine Dong, Macungie, PA (US); Madhukar Bhaskara Rao, Fogelsville, PA (US); Dingjun Wu, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 307 days.

(21) Appl. No.: 10/191,719

(22) Filed: Jul. 9, 2002

(65) Prior Publication Data

US 2004/0009873 A1 Jan. 15, 2004

(51) Int. Cl.
*B01J 20/00* (2006.01)

(52) U.S. Cl. .................................... 502/415

(58) Field of Classification Search ............... 502/415, 502/417, 86, 74, 73, 66, 200, 226, 227, 229, 502/231
See application file for complete search history.

(56) References Cited

U.S. PATENT DOCUMENTS

| | | | | |
|---|---|---|---|---|
| 4,016,068 A | * | 4/1977 | Rausch | 208/139 |
| 4,068,387 A | * | 1/1978 | Manos | 34/352 |
| 4,500,327 A | | 2/1985 | Nishino et al. | |
| 4,761,395 A | | 8/1988 | Tom et al. | 502/401 |
| 5,135,548 A | | 8/1992 | Golden et al. | 55/25 |
| 5,174,974 A | * | 12/1992 | Birbara et al. | 423/230 |
| 5,264,187 A | * | 11/1993 | Olbrich et al. | 422/190 |
| 5,529,970 A | | 6/1996 | Peng | 502/400 |
| 5,531,971 A | | 7/1996 | Tom et al. | 423/210 |
| 5,656,064 A | | 8/1997 | Golden et al. | 95/96 |
| 5,776,850 A | | 7/1998 | Klatte et al. | |
| 5,876,488 A | * | 3/1999 | Birbara et al. | 96/111 |
| 6,033,460 A | | 3/2000 | Snow | |
| 6,241,955 B1 | | 6/2001 | Alvarez, Jr. | 423/210 |

FOREIGN PATENT DOCUMENTS

| | | |
|---|---|---|
| EP | 0 283 965 A2 | 9/1988 |
| EP | 0 433 677 A1 | 6/1991 |
| EP | 0470936 | 2/1992 |
| EP | 0484301 | 5/1992 |
| EP | 0 914 863 A1 | 5/1999 |
| EP | 1176120 | 1/2002 |
| GB | 416711 | 9/1934 |
| JP | 97142833 | 2/1989 |
| RU | 2077944 C1 | 4/1997 |
| WO | WO0023174 | 4/2000 |

OTHER PUBLICATIONS

P. Kung, et al., *Opto-electronics Review*, 8(3) 201-239 (2000), no month.
European Search Report No. 03014475.2-2104 dated Nov. 10, 2003.

* cited by examiner

*Primary Examiner*—Edward M. Johnson
(74) *Attorney, Agent, or Firm*—Geoffrey L. Chase; Joseph D. Rossi

(57) ABSTRACT

The present invention provides an adsorbent for removing water and/or other oxygen-containing impurities from a fluid comprising ammonia to the ppb level and methods for making and using same. The adsorbent preferably comprises a substrate having a plurality of pores and a surface area that ranges from about 100 to about 2,500 m$^2$/g and a compound disposed within a least a portion of the substrate. In certain preferred embodiments, the compound comprises at least one cation from the group consisting of ammonium (I), lithium (I), sodium (I), potassium (I), cesium (I); magnesium (II), calcium (II), strontium (II), barium (II), manganese (II), nickel (II), iron (II), zinc (II); aluminum (III), indium (III), iron (III), and zirconium (IV) or combinations thereof that is ionically associated with an anion from the group consisting of halide, sulfide, sulfite, or sulfate.

21 Claims, 2 Drawing Sheets

ADSORBENT FOR WATER REMOVAL FROM AMMONIA

BACKGROUND OF THE INVENTION

The present invention relates generally to the removal of impurities contained in fluidic streams. More specifically, the invention relates to adsorbents for the removal of water and/or other oxygen-containing impurities from fluid streams comprising ammonia and methods for making and using same.

Ultra-high purity (UHP) ammonia ($NH_3$) is widely used in a variety of different applications. For example, UHP ammonia may be used in the semiconductor industry for forming silicon nitride barrier layers in integrated circuits (IC). It is believed that the silicon nitride layers prevent metal migration during IC processing. Further, UHP ammonia is needed for manufacturing metal nitrides, such as gallium nitride, aluminum nitride, and indium nitride, that are used in light emitting diodes (LED) and laser diodes. These metal nitrides have the ability to emit light over a wide-spectral range. With the blue light capability, manufacturers of LEDs are now able to make these devices in any color of the spectrum. Furthermore, laser diodes are key components of optical storage media, see, e.g., P. Kung and M. Razeghi, *Opto-electronics Review,* 8(3) 201-239 (2000).

The electrical properties of devices such as IC devices and LEDs are very dependent on the impurity level in the nitride layers, which, in turn, is directly related to the purity of source ammonia used in manufacturing. Therefore, a purification system is normally required to remove impurities in ammonia. This purification is often done by passing a stream of gaseous or liquid ammonia through a purifier. One major target of the purifier is oxygen-containing impurities. Trace levels of oxygen-containing impurities in ammonia, such as water ($H_2O$), oxygen ($O_2$), carbon monoxide (CO), and carbon dioxide ($CO_2$), can adversely affect production yields during the manufacture of semiconductor or other electronics devices as well as the end-product performance.

Among the oxygen-containing impurities, water may be the most challenging to remove. Water has a high affinity for ammonia due to its similar physical and chemical properties, e.g. molecular size and hydrogen bonding. For the manufacturing of semiconductor or other electronic devices, ammonia having water concentration at the ppm level is considered unacceptable. To ensure satisfactory performance of the manufactured device, the water content in the ammonia must be reduced to the ppb level, i.e., less than 100 ppb or below. Current drying methods and materials may have certain limitations when removing water and other oxygen-containing species down to the ppb level.

Ammonia has been traditionally supplied as a cylinder gas because the consumption rate of ammonia in these processes has been relatively low. Recently, however, the rapid growth in the LED market has increased the usage of ammonia thereby making it uneconomical to supply or use ammonia in this manner. Subsequently, the electronics industry is moving to "bulk supply" systems in which large storage vessels are used to supply ammonia. Using these systems, it would be more preferable to purify the ammonia at the storage vessel. This places new demands on the ammonia purification system. In this connection, the purifier must be capable of handling and purifying ammonia at relatively higher flow rates. Further, it is desirable for purifiers of bulk supply systems to have a longer useful life than point of use purifiers.

Bulk supply purification systems for removal of impurities from ammonia typically involve a purification bed containing sorbent media, scavengers, or adsorbents. These purification beds tend to be relatively large and the adsorbents contained therein are comparatively expensive. In order to reduce the operating costs and size of the system as well improve separation efficiency, it is desirable that the adsorbent satisfy one or more of the following criteria. First, the adsorbent should have relatively fast sorption kinetics since the efficiency of a purifier is directly related to the rate of sorption of the impurity on the media. Faster sorption rates may allow for smaller sorption beds thereby increasing the purification efficiency at a lower cost. Second, the adsorbent should have relatively high sorption capacity since the size of the purifier is directly related to the sorption capacity of the adsorbent. Adsorbents with high capacity are thus required to reduce the overall purifier size and cost. In addition, a relatively high adsorption capacity at the water partial pressure range of interest, up to $6.65 \times 10^{-3}$ torr, is necessary to reduce the impurity levels of ammonia to the ppb level. Third, the adsorbent should be stable in ammonia to prevent the formation of gaseous or volatile by-products generated during purification. Fourth, the adsorbent should be nonvolatile at the temperatures needed for purification. Lastly, the adsorbent is preferred to be regenerable.

There are a number of physical and chemical adsorption methods in the prior art for removing water and other oxygen-containing impurities from ammonia. One chemical adsorption method to remove water from ammonia involves metal oxide adsorbents. For example, Japanese Patent 97142833 discloses removal of water from ammonia by contacting the gas with an adsorbent comprising BaO, or a mixture containing BaO as the major compound, whereby water is removed through a chemical reaction with the metal oxide. Because the major mass transfer limitation may be through the reaction product, this approach may suffer from low adsorption kinetics.

Another chemical adsorption method is described in EPs 0484301 B1 and 0470 936 B1. These patents describe the use of hydrogenated getter metal alloys comprised of varying amounts of zirconium (Zr), vanadium (V) and iron (Fe) with a preferred composition of 70% Zr, 24.6% V, and 5.4% Fe. These hydrogenated getter metal alloy adsorbents are impractical for bulk purification of ammonia for several reasons. The preparation of these alloys involves multiple steps prior to use: the alloys need to be activated by heating to elevated temperatures of around 350° C. in a reducing gas stream and the alloys need to hydrogenated, or treated in a stream of hydrogen. Further, the alloys may require an operating temperature of over 100° C. to work properly.

Yet another chemical adsorbent method is disclosed in U.S. Pat. No. 6,241,955. The '955 patent discloses an adsorbent that is a reduced metal oxide, solid substrate having a surface area of 100 $m^2/g$ or larger. An oxide, such as manganese or molybdenum oxides, is partially reduced in $H_2$ or another agent to produce active sorption sites. It is believed that the gaseous contaminants are removed by a combination of reaction with metal active sites and adsorption on the substrate surface.

A still further example of a chemical adsorption method is disclosed in European patent application EP 1,176,120. The '120 application describes removing water and other impurities from ammonia by contacting the ammonia with an adsorbent having manganese oxide and/or nickel oxide as an active ingredient on a porous support. The adsorbent is prepared by reduction in hydrogen of the metal oxide at temperatures greater than 500° C. for manganese and up to 350° C. for nickel. The ammonia may further be passed through a bed of synthetic zeolite.

Further examples of prior art, chemical adsorbents consist of a scavenger deposited on an organic support. For example, U.S. Pat. No. 4,761,395 discloses metallic carbanion or anion scavengers on an organometallic support. The active scavenger sites are formed by the reaction between a protonated carbanion and an organic deprotonating agent. A major concern of using this approach is the possibility of releasing hydrocarbon impurities to the purified gas stream if the organic deprotonating agent is not fully removed from the support or if the protonated carboanion is an organic material. Hydrocarbon contamination, even at very low levels, may be deleterious to semiconductor devices. Yet another example of a scavenger on an organic support is found in U.S. Pat. No. 5,531,971. The '971 patent discloses a pyrolyzed metal scavenger deposited on a polymeric or macroreticulate polymer support. The pyrolyzed metals are selected from Group IA of the Periodic Table. One potential problem with this approach is that the scavenger may release metal particles into the purified gas stream. Further, the reaction between free alkyl metal and water may release gaseous $H_2$. The introduction of new impurities from either of the adsorbents described in the '395 or '971 patents, namely hydrocarbons, metal particles, and gaseous $H_2$, is unacceptable in the manufacturing of semiconductor, LED, or other electronic devices.

Further examples of prior art chemical adsorption methods involve scavengers deposited on an inorganic support. In this connection, published application WO 00/23174 describes a scavenger that comprises an active agent on an inorganic support such as a zeolite, alumina, or silica material. The active agent is formed by pyrolysis of an adsorbed hydride at an elevated temperature. Because of the limited number of function groups on the surface of an inorganic support and the unfavorable pyrolysis reaction, the amount of active sites may be limited.

A still further example of a prior art adsorption method is the use of $CaSO_4$ by itself to remove water from ammonia. One drawback to this approach is the low achievable water adsorption efficiency due to its limited surface area.

The aforementioned chemical adsorption methods are typically not regenerable because the reaction between the active phase of the scavenger and water is almost irreversible. To remedy this, physical adsorption on molecular sieves may be used to remove water from ammonia. This method, however, may be inefficient because of the thermodynamic properties of ammonia and water. Since their thermodynamic properties are similar, ammonia and water may compete for the adsorption sites on the material.

Accordingly, there is a need in the art to provide new adsorbents to purify ammonia to the ppb level. There is a need in the art to provide regenerable adsorbents that have a relatively high sorption capacity and relatively faster sorption kinetic. There is also a need in the art to provide adsorbents that operate effectively at ambient temperatures. Further, there is a need in the art for adsorbents that can avoid the introduction of additional contaminants into ammonia during the purification process. Moreover, there is a need in the art for processes for making adsorbents that require fewer process steps to manufacture and have lower activation temperatures.

All references cited herein are incorporated herein by reference in their entirety.

BRIEF SUMMARY OF THE INVENTION

The present invention fulfills some, if not all, of the needs in the art by providing adsorbents for removal of water and/or other oxygen-containing impurities from a fluid comprising ammonia. The present invention is directed to, in part, an adsorbent comprising a substrate having a plurality of pores and a surface area that ranges from about 100 to about 2,500 $m^2/g$ and a compound disposed within at least a portion of the substrate. In certain preferred embodiments, the compound comprises at least one cation from the group consisting of ammonium (I), lithium (I), sodium (I), potassium (I), cesium (I); magnesium (II), calcium (II), strontium (II), barium (II), manganese (II), nickel (II), iron (II), zinc (II); aluminum (III), indium (III), iron (III), and zirconium (IV) or combinations thereof that is ionically associated with an anion from the group consisting of halide, sulfide, sulfite, or sulfate.

In a further aspect of the present invention, there is provided a method for preparing an adsorbent for removing water from a fluid comprising ammonia that comprises the steps of providing a mixture comprising at least one cation selected from the group consisting of ammonium (I), lithium (I), sodium (I), potassium (I), cesium (I); magnesium (II), calcium (II), strontium (II), barium (II), manganese (II), nickel (II), iron (II), zinc (II); aluminum (III), indium (III), iron (III), and zirconium (IV) or combinations thereof that is ionically associated with an anion from the group consisting of halide, sulfide, sulfite, and sulfate; impregnating a porous substrate with the mixture to form an adsorbent precursor; and heating the adsorbent precursor to one or more temperatures of at least about 100° C. or greater to form the adsorbent. In certain preferred embodiments, the mixture further comprises a solvent.

In yet a further aspect of the present invention, there is disclosed a method for making an adsorbent having at least one cation ionically associated with at least one anion. This method comprises the steps of providing a compound precursor having at least one cation selected from the group consisting of ammonium (I), lithium (I), sodium (I), potassium (I), cesium (I); magnesium (II), calcium (II), strontium (II), barium (II), manganese (II), nickel (II), iron (II), zinc (II); aluminum (III), indium (III), iron (III), and zirconium (IV) or combinations thereof; depositing the compound precursor on at least a portion of a porous substrate to form an adsorbent precursor; and heating the adsorbent precursor to a temperature of at least about 100° C. or greater in a gaseous atmosphere to provide at least one anion from the group consisting of halides, sulfides, sulfites, or sulfates; and reacting the at least one cation and the at least one anion under temperature conditions sufficient to form the adsorbent.

In still a further aspect of the present invention, there is provided a method for removing water from a fluid comprising ammonia and water wherein the water contained within the fluid is at a partial pressure ranging from about $10^{-9}$ atm to about $9 \times 10^{-4}$ atm by passing the fluid over an adsorbent comprising from about 1 to about 80% of a compound supported on a porous substrate at temperatures ranging from about −40° to about 70° C. The compound comprises at least one cation from the group consisting of ammonium (I), lithium (I), sodium (I), potassium (I), cesium (I); magnesium (II), calcium (II), strontium (II), barium (II), manganese (II), nickel (II), iron (II), zinc (II); aluminum (III), indium (III), iron (III), and zirconium (IV) or combinations thereof that is ionically associated with an anion from the group consisting of halide, sulfide, sulfite, or sulfate.

These and other aspects of the invention will become apparent from the following detailed description.

DETAILED DESCRIPTION OF THE INVENTION

Figure 1:
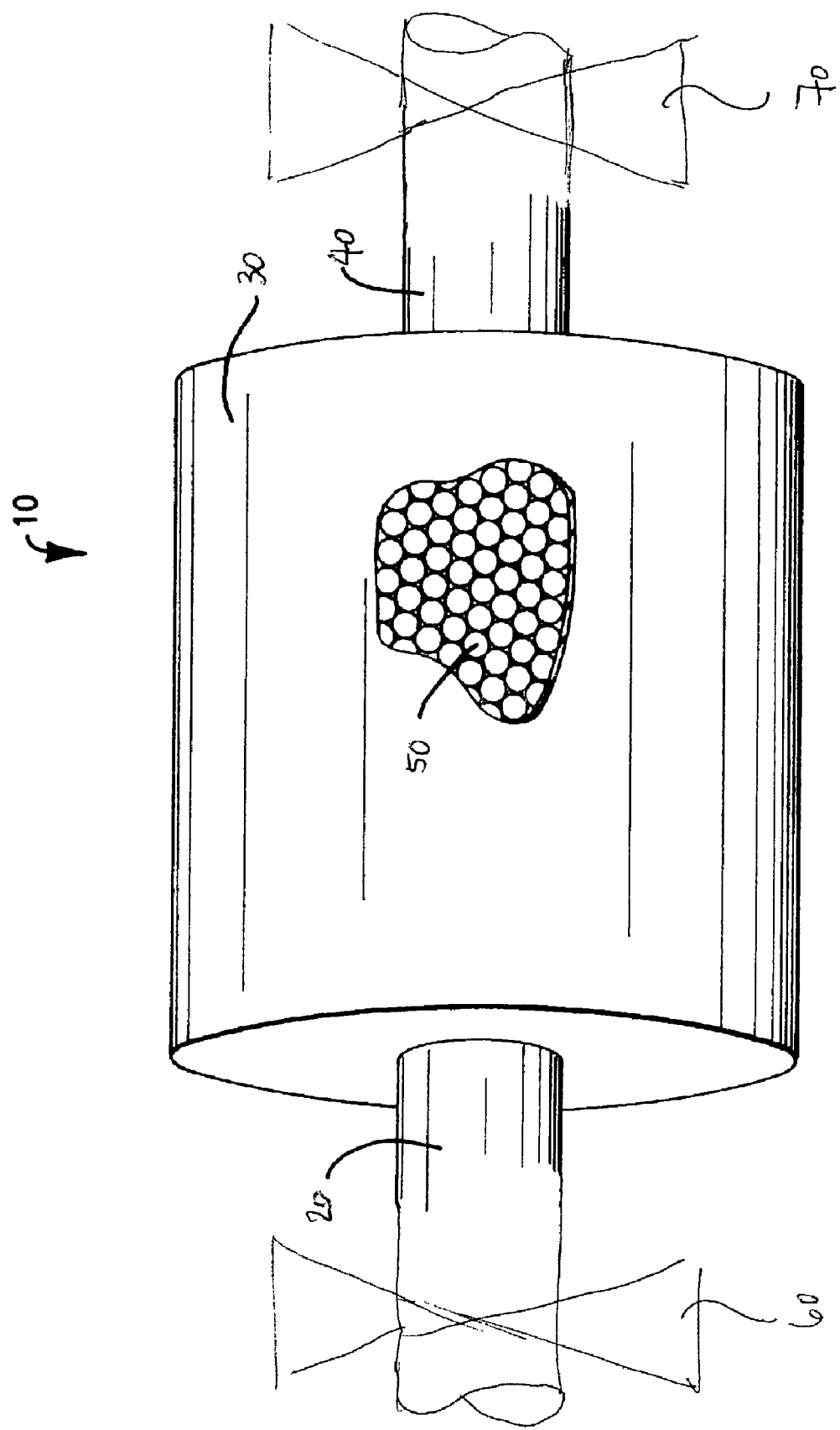
FIG. 1 provides an example of an apparatus that contains one embodiment of the adsorbent of the present invention.

The present invention is directed to adsorbents for removing water and/or other oxygen-containing impurities from gaseous or liquid ammonia to the ppb level or below and methods for making and using same. In certain preferred embodiments, the adsorbent consists of a compound disposed within a substrate. The compound can preferentially react with water, and/or other oxygen-containing impurities, to form a stable hydrate at ambient or sub-ambient temperatures. The substrate is used to increase the surface area of the compound and thus increase the adsorption capacity of the adsorbent.

The adsorbents of the present invention are preferably used to remove or reduce oxygen-containing impurities, such as water and/or oxygen or carbon dioxide, from a fluid stream comprising ammonia. The term "fluid" as used herein denotes liquid as well as gaseous forms of a substance. In some embodiments of the present invention, the fluid may further comprise other hydride fluids besides, or in addition to, ammonia. Some examples of these fluids include, but are not limited to, $PH_3$, $AsH_3$, $B_2H_6$, $SiH_4$, and $Si_2H_6$, and lower alkyl derivatives of ammonia represented by the formula $R_aNH_b$ wherein a and b are numbers which range from 0 to 3 and the sum of a plus b equals 3, and mixtures thereof.

The compound of the present invention comprises at least one monovalent, bivalent, trivalent, tetravalent cation or combinations thereof. Suitable cations may include monovalent cations such as ammonium (I), lithium (I), sodium (I), potassium (I), or cesium (I); bivalent cations such as magnesium (II), calcium (II), strontium (II), barium (II), manganese (II), nickel (II), zinc (II), or iron (II); trivalent cations such as aluminum (III), indium (III), iron (III); and tetravalent cations such as zirconium (IV). In certain preferred embodiments, the cation comprises at least one cation from the group consisting of ammonium, cesium, calcium and zirconium.

The cation is ionically associated with an anion to form the compound. Exemplary anions include any one from the group consisting of halides such as Cl—, Br—, F—, I—; sulfide ($S^{2-}$); sulfites ($SO_3^{2-}$); or sulfates ($SO_4^{2-}$). The anions may be introduced to the cation in the form of an acid to form a salt. In this connection, the compound may be a salt having a higher valence cation and an anion of sulphuric acid. Some acid sources for the anions include, but are not limited to, hydrochloric acid, hydrobromic acid, hydrofluoric acid, hydrosulphuric acid, sulphurous acid, or sulphuric acid.

In certain preferred embodiments, the compound comprises an inorganic salt. In preferred embodiments, the compound may be ammonium sulfate, zirconium sulfate, calcium sulfate, or cesium sulfate.

The compounds suitable for the adsorbents of the present invention preferably exhibit one or all of the following characteristics. First, the compound may be hydroscopic at the water partial pressure range up to $6.65 \times 10^{-3}$ torr. Second, the compound has a low volatility within a fluid stream comprising ammonia and water and/or other oxygen-containing impurities. Third, the compound may have a low tendency of forming coordination compounds with ammonia or is substantially non-reactive with ammonia. Lastly, the compound is preferably soluble in water or other solvent.

As mentioned previously, the adsorbents of the present invention as comprised of a compound disposed within at least a portion of the substrate. The substrate comprises a material that is stable in the fluid to be purified such as, for example, alumina, activated carbon, zeolites, or other similar materials. Preferably, the substrate is comprised of an inorganic material to avoid releasing hydrocarbon compounds into the purified fluid. In certain preferred embodiments, the substrate comprises alumina.

The substrates used for the adsorbents of the present invention have a plurality of pores and a relatively high specific surface area. The average pore size within the substrate ranges from about 8 to about 500 Angstroms. The surface area of the substrate ranges from about 100 to about 2,500 $m^2/g$, preferably about 100 to about 1,500 $m^2/g$, and more preferably about 100 to about 1,200 $m^2/g$.

The substrates of the present invention are preferably thermally stable at temperatures at which the adsorbent is used to maintain the structure of the support. The substrate is thermally stable at temperatures of about 150° C. or greater, and more preferably at temperatures of about 300° C. or greater.

In the adsorbents of the present invention, the compound is disposed within at least a portion of the substrate. The compound may be disposed within the substrate in the form of particulates or agglomerates within the substrate, as a film or plating deposited upon or within on the substrate, or localized within the pores of the substrate. The weight percentage of compound disposed within the substrate can range from about 1 to about 80%, more preferably from about 2 to about 50%, and more preferably from about 5 to about 30%.

The adsorbent may be formed in a variety of different ways. In certain embodiments, the adsorbent is made by exposing the substrate to a mixture containing the compound or compound precursors. The mixture may further include a solvent. In embodiments where a solvent is used, the solvent selected will preferably not react with the substrate. Suitable solvents include, but are not limited to, water, hydrocarbons (e.g., pentane or hexane); halocarbons (e.g. Freon 113); ethers (e.g., ethylether ($Et_2O$) or tetrahydrofuran ("THF")); nitriles (e.g., $CH_3CN$); or aromatic compounds (e.g., benzotrifluoride). The compound is added to the mixture at room temperature or higher to substantially dissolve the compound within the mixture. The temperature for dissolution will vary depending upon the boiling point of the solvent. In this connection, the concentration of the compound within the mixture needs to be controlled to below its solubility limit at the applied dissolution temperature. In certain embodiments, the hydrated salt of the compound can be added to the mixture to reduce the dissolution heat.

The mixture comprising the compound is impregnated into at least a portion of the porous substrate to form the adsorbent precursor. This step is preferably performed at the same temperature as that for making the mixture. The impregnation step can be performed in a variety of different methods including, but not limited to, soaking the substrate material into the mixture, the incipient wetness method, or vacuum impregnation. In the incipient wetness method, the volume of the mixture that is poured over the substrate material is sufficient to fill the pores of the substrate without the existence of a standing mixture. In other words, the amount of mixture used is roughly equivalent to the pore volume of the substrate material to be impregnated. The method selected is dependent upon various factors such as the degree of saturation of the mixture, the viscosity of the mixture, the selection of substrate, and the affinity between the mixture and the porous substrate. In embodiments where the solvent does not wet the substrate, the vacuum impregnation method can be used.

In certain embodiments of the present invention, the impregnated substrate or adsorbent precursor may be dried. For example, the adsorbent precursor is dried to remove the excess solvent in embodiments where a solvent is added to the mixture. The drying step may be performed at room temperature and ambient atmosphere to create open channels within the substrate. Alternatively, the drying step may be done using vacuum to increase the rate and the efficiency of the drying process. In a further embodiment of the present invention, the drying step maybe incorporated into the activation or heating step by heating to one or more temperatures prior to reaching the activation temperature of the adsorbent. For example, the drying step may be performed as a gradual ramp or increase in temperature prior to reaching the activation temperature or may be a controlled soak at one or more temperatures below the activation temperature.

In the activation step, the adsorbent precursor is heated to one or more temperatures greater than 100° C. Preferably, the heating step is conducted to one or more temperatures that range from between about 100° C. to about 1,000° C., preferably about 100° C. to about 600° C., and more preferably about 100° C. to about 400° C. The activation temperature of the adsorbent precursor can be determined by thermal gravimetric analysis (TGA) or other means. The heating may be performed under vacuum or within an inert atmosphere, such as $N_2$ or He. The atmosphere for the activation step may vary depending upon the composition of the compound and/or the substrate. For example, in embodiments where the adsorbent comprises an ammonium sulfate, $(NH_4)_2SO_4$, deposited upon a substrate, the activation step is preferably conducted under a $NH_3$ atmosphere to prevent decomposition of $(NH_4)_2SO_4$ into $NH_4HSO_4$.

In other embodiments of the present invention, the adsorbent is formed via a thermal deposition method. This method may be suitable for embodiments where the compound is insoluble in water or other solvents. In these embodiments, a compound precursor that contains at least one of the same cations as the cation within compound is deposited onto at least a portion of the porous substrate. The compound precursor comprises at least one cation from the group consisting of lithium (I), sodium (I), potassium (I), cesium (I), magnesium (II), calcium (II), strontium (II), barium (II), manganese (II), nickel (II), zinc (II), iron (II), aluminum (III), indium (III), iron (III), zirconium (IV), or ammonium (I). The substrate containing the compound precursor is heated to one or more temperatures of at least 100° C. or greater in an atmosphere containing at least one anion that is the same as the anion in the compound. In certain preferred embodiments, the atmosphere comprises a halide gas such as $Cl_2$, $Br_2$, $I_2$, or $F_2$, a sulfur-containing gas, or combinations thereof. The compound is formed on at least a portion of the substrate from the reaction of the at least one cation from the compound precursor and the gas containing the at least one anion.

The adsorbents of the present invention are typically used within a purification apparatus. FIG. 1 provides an example of one embodiment of the purification apparatus 10 comprising the adsorbent of the present invention. Apparatus 10 consists of a fluid inlet 20, a chamber 30, and a fluid outlet 40. Chamber 30 contains an adsorbent 50 that may be in the form of particles, pellets, rods, morsels, honeycomb, discs, blocks, saddles, or any other shape depending upon the use. Adsorbent 50 consists of a compound that is disposed within at least a portion of the substrate as described herein. Apparatus 10 further has inlet valve 60 and outlet valve 70 that are in fluid communication with fluid inlet 10 and fluid outlet 40. Inlet valve 60 and outlet valve 70 are used to regulate the flow of fluid that is passed through apparatus 10. In certain preferred embodiments, the inlet and outlet valves 60 and 70 may be connected to a central processing unit which can control the operation of both valves. For example, valves 60 and 70 may open and close in sequence or out of sequence to create a full fluid flow, pulsed fluid flow, or variations in-between.

The adsorbents of the present invention are believed to react with the water or and/or other oxygen containing impurities within the fluid stream to form a stable hydrate at temperatures that range between about −40° to about 70° C. The adsorbents may be regenerated or reused because the formed hydrates can be dissociated at an elevated temperature or the activation temperature of the adsorbent. The adsorbents of the present invention reduce the amount of water within the incoming fluid stream to below about 100 ppb, preferably below about 10 ppb, and more preferably below about 1 ppb.

The invention will be illustrated in more detail with reference to the following examples, but it should be understood that the present invention is not deemed to be limited thereto.

EXAMPLES

Example I

Preparation of a Cesium Sulfate and Alumina Adsorbent

A sample adsorbent of $Cs_2SO_4$ deposited onto an inorganic $Al_2O_3$ substrate was made according to the following steps: dissolving 40 gm of $Cs_2SO_4$ in 50 cc of distilled water; adding 10 grams of Alcan AA-300 $Al_2O_3$ into the above solution; decanting the solution after mixing; and drying the sample at room temperature overnight. The sample contained 38 weight % of $Cs_2SO_4$. The water isotherm of the sample was measured by gravimetric microbalance. The sample was activated at 350° C. under helium flow for 12 hours and then a helium flow with a predetermined water level was passed across the sample until equilibrium was reached. At a water partial pressure of 0.00023 torr, the sample had a water capacity of 0.123 mmole/g.

Example II

Preparation of a Zirconium Sulfate and Alumina Adsorbent

Figure 2:
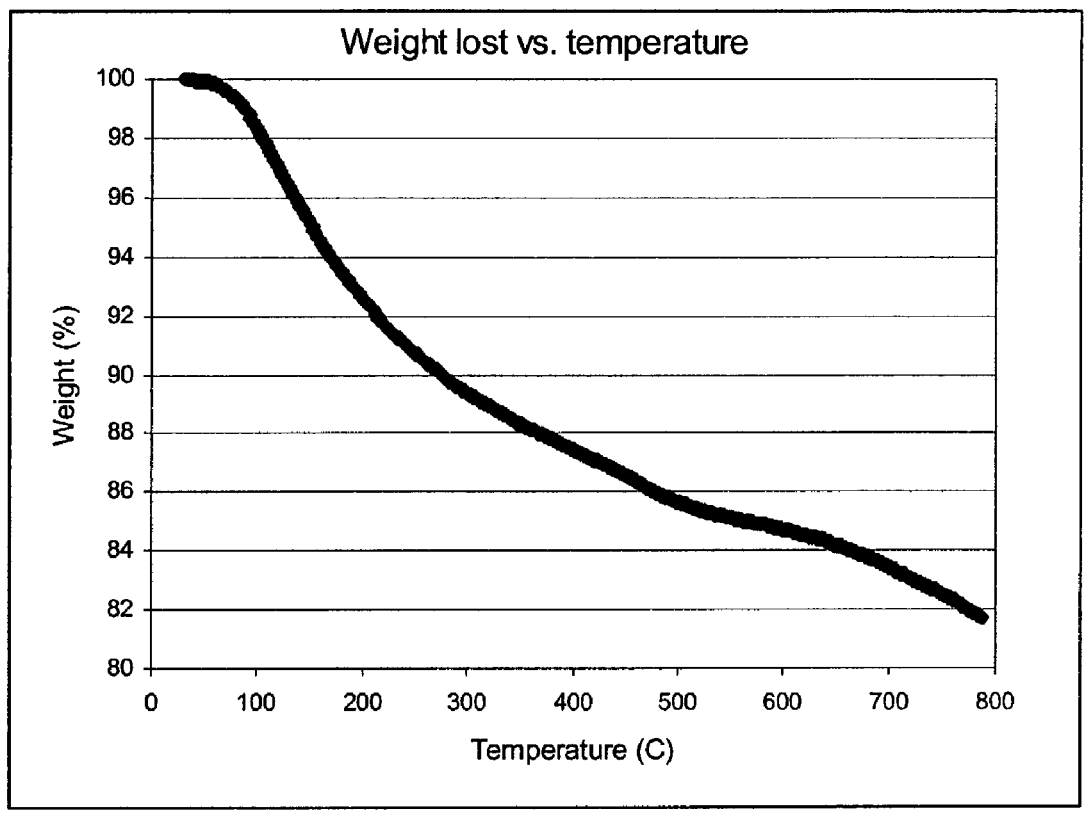
FIG. 2 provides an illustration of the percentage weight loss vs. temperature of one embodiment of adsorbent of the present invention.

A sample adsorbent of $Zr(SO_4)_2$ deposited onto an inorganic $Al_2O_3$ substrate was made according to the following steps: adding 10.2 gm of Alcan M-300 $Al_2O_3$ into a solution of 10 gm $Zr(SO_4)_2$ dissolved in 18 cc of distilled water and then drying the impregnated $Al_2O_3$ at room temperature overnight. The sample contained 25 weight % of $Zr(SO_4)_2$. A thermogravimetric analysis (TGA) was performed to measure the sample's water capacity and activation temperature. The conditions for the TGA were as follows: 91.576 mg of the sample was placed in the TGA equipment and then heated to 800° C. at 10° C./min under a 100 cc/min $N_2$ flow. The weight change of the sample is shown in FIG. 2. As FIG. 2 illustrates, there is about 9% weight loss and no $SO_2$ observed between 110° C. and 350° C. Since no $SO_2$ is observed, this weight loss is due to water removal. These results further indicate that the sample can be activated at one or more temperatures below 350° C. and has approximately 5 mmole/g capacity for strongly adsorbed water as determined in the following manner:

1 g water=$\frac{1}{18}$ mole water=$\frac{1,000}{18}$ mmole water

9% weight loss=0.09 g water removed per g adsorbent 0.09×$\frac{1000}{18}$ mmole water removed=5 mmole water removed per g adsorbent While the invention has been described in detail and with reference to specific examples thereof, it will be apparent to one skilled in the art that various changes and modifications can be made therein without departing from the spirit and scope thereof.

We claim:

1. An adsorbent for removing water from a fluid comprising ammonia, the absorbent comprising:
   a substrate having a plurality of pores and a surface area that ranges from about 100 to about 2,500 $m^2/g$; and
   a compound disposed within at least a portion of the substrate, the compound comprising at least one cation selected from the group consisting of ammonium (I), lithium (I), potassium (I), cesium (I); magnesium (II), calcium (II), strontium (II), barium (II), manganese (II), zinc (II); aluminum (Ill), indium (Ill), and zirconium (IV) or combinations thereof that is ionically associated with an anion from the group consisting of sulfide, sulfite and sulfate.

2. The adsorbent of claim 1 wherein the surface area ranges from about 100 to about 1,500 $m^2/g$.

3. The adsorbent of claim 2 wherein the surface area ranges from about 100 to about 1,200 $m^2/g$.

4. The adsorbent of claim 1 wherein the average pore size within the substrate ranges from about 8 to about 500 Angstroms.

5. The adsorbent of claim 1 wherein the weight percentage of compound disposed within the substrate ranges from about 1 to about 80%.

6. The adsorbent of claim 5 wherein the weight percentage of compound disposed within the substrate ranges from about 2 to about 50%.

7. The adsorbent of claim 1 wherein the cation comprises ammonium.

8. The adsorbent of claim 7 wherein the anion comprises sulfate.

9. The adsorbent of claim 1 wherein the substrate is selected from the group consisting of alumina, activated carbon, or zeolite.

10. A method for preparing an adsorbent for removing water from ammonia, the method comprising:
    providing a mixture comprising at least one cation selected from the group consisting of ammonium (I), lithium (I), potassium (I), cesium (I); magnesium (II), calcium (II), strontium (II), barium (II), manganese (II), zinc (II); aluminum (Ill), indium (Ill), and zirconium (IV) or combinations thereof that is ionically associated with an anion from the group consisting of sulfide, sulfite, and sulfate;
    impregnating a porous substrate with the mixture to form an adsorbent precursor; and
    heating the adsorbent precursor to a temperature of at least about 100° C.or greater to form the adsorbent.

11. The method of claim 10 wherein the mixture further comprises a solvent.

12. The method of claim 11 wherein the method further comprises the step of removing the solvent from the adsorbent precursor.

13. The method of claim 12 wherein the removing and heating are conducted simultaneously.

14. The method of claim 10 wherein the heating is conducted under vacuum conditions.

15. The method of claim 10 wherein the heating is conducted in a nitrogen atmosphere.

16. The method of claim 10 wherein the heating is conducted in an inert atmosphere.

17. The method of claim 10 wherein the substrate is selected from the group consisting of alumina, activated carbon, or zeolite.

18. A method for preparing an adsorbent comprising at least one cation ionically associated with at least one anion, the method comprising:
    providing a compound precursor having at least one cation is selected from the group consisting of ammonium (I), lithium (I), sodium (I), potassium (I), cesium (I); magnesium (II), calcium (II), strontium (II), barium (II), manganese (II), zinc (II); aluminum (Ill), indium (Ill), and zirconium (IV) or combinations thereof;
    depositing the compound precursor on at least a portion of a porous substrate to form an adsorbent precursor;
    heating the adsorbent precursor to a temperature of at least about 100° C. or greater in a gaseous atmosphere to provide an anion from the group consisting of halide, sulfide, sulfite, or sulfate, wherein the gaseous atmosphere comprises a halide gas, a sulfur-containing gas, and combinations thereof; and
    reacting the at least one cation and an anion under temperature conditions sufficient to form the adsorbent.

19. The method of claim 18 wherein the substrate is selected from the group consisting of alumina, activated carbon, or zeolite.

20. An adsorbent for removing water from a fluid comprising ammonia comprising:
    a substrate comprising an inorganic material, a plurality of pores with an average pore size ranging from about 8 to about 500 Angstroms, and a surface area ranging from about 100 to about 2,500 $m^2/g$; and
    from 1 to 80% by weight of a compound disposed within at least a portion of the substrate, the compound comprising at least one cation selected from the group consisting of ammonium (I), lithium (I), potassium (I), cesium (I); magnesium (II), calcium (II), strontium (II), barium (II), manganese (II), zinc (II); aluminum (Ill), indium (Ill), and zirconium (IV) or combinations thereof that is ionically associated with an anion from the group consisting of sulfide, sulfite and sulfate.

21. The method of claim 18 wherein the gaseous atmosphere comprises a halide gas, a sulfur-containing gas, or combinations thereof.

* * * * *